United States Patent
Otake et al.

(10) Patent No.: US 8,427,708 B2
(45) Date of Patent: Apr. 23, 2013

(54) APPARATUS AND METHOD FOR CONTROLLING PRINTING OF INFORMATION EMBEDDED IN A DOCUMENT

(75) Inventors: Toshihiko Otake, Nishinomiya (JP); Takashi Kamada, Sakai (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1633 days.

(21) Appl. No.: 11/222,795

(22) Filed: Sep. 12, 2005

(65) Prior Publication Data
US 2006/0238824 A1   Oct. 26, 2006

(30) Foreign Application Priority Data
Apr. 20, 2005   (JP) .................. 2005-122200

(51) Int. Cl.
G06K 15/00 (2006.01)
G06F 3/12 (2006.01)
H04N 1/40 (2006.01)

(52) U.S. Cl.
USPC ............. 358/3.28; 358/1.1; 358/1.2; 358/1.6; 358/2.1; 358/3.12; 358/1.13

(58) Field of Classification Search ............ 358/1.1, 358/1.2, 1.6, 2.1, 3.12, 1.13, 3.28; 382/282, 382/284; 380/51, 246, 243
See application file for complete search history.

(56) References Cited

U.S. PATENT DOCUMENTS

| | | | | |
|---|---|---|---|---|
| 5,321,470 A | * | 6/1994 | Hasuo et al. | 399/366 |
| 5,440,409 A | * | 8/1995 | Sugano et al. | 358/501 |
| 6,185,404 B1 | * | 2/2001 | Hasuo et al. | 399/366 |
| 2003/0142331 A1 | * | 7/2003 | Tanaka | 358/1.9 |
| 2004/0148507 A1 | | 7/2004 | Iwamura et al. | |
| 2005/0200910 A1 | * | 9/2005 | Kanoshima et al. | 358/448 |
| 2007/0147929 A1 | * | 6/2007 | Ishimoto et al. | 400/62 |
| 2007/0271464 A1 | * | 11/2007 | Rico Novella | 713/181 |
| 2008/0104715 A1 | * | 5/2008 | Saka et al. | 726/31 |

FOREIGN PATENT DOCUMENTS

| | | | |
|---|---|---|---|
| JP | 07-058950 | | 3/1995 |
| JP | 2000-134462 | * | 5/2000 |
| JP | 2000-134462 A | | 5/2000 |
| JP | 2001-197297 | | 7/2001 |
| JP | 2004-153568 | | 5/2004 |
| JP | 2004-201068 | | 7/2004 |
| JP | 2004-228897 | | 8/2004 |
| JP | 2004-260606 A | | 9/2004 |
| JP | 2004-336431 A | | 11/2004 |

OTHER PUBLICATIONS

Kokaram et al, Interpolation of Missing Data in Image Sequences, Nov. 1995, IEEE Transactions on Image Processing, vol. 4, No. 11, pp. 1509-1519.*
Japanese Office Action dated May 22, 2007, directed to a counterpart JP Application No. 2005-122200 (6 pages).

* cited by examiner

*Primary Examiner* — Cheukfan Lee
(74) *Attorney, Agent, or Firm* — Morrison & Foerster LLP

(57) ABSTRACT

When an image is formed, a document including an original image and an original additional image is read to provide document image data, the additional image being visualized when the document is reproduced. Original image data in correspondence to the original image is extracted from the document image data, and output image data is created based on the extracted original image data. Then, printing is performed based on the created output image data.

20 Claims, 3 Drawing Sheets

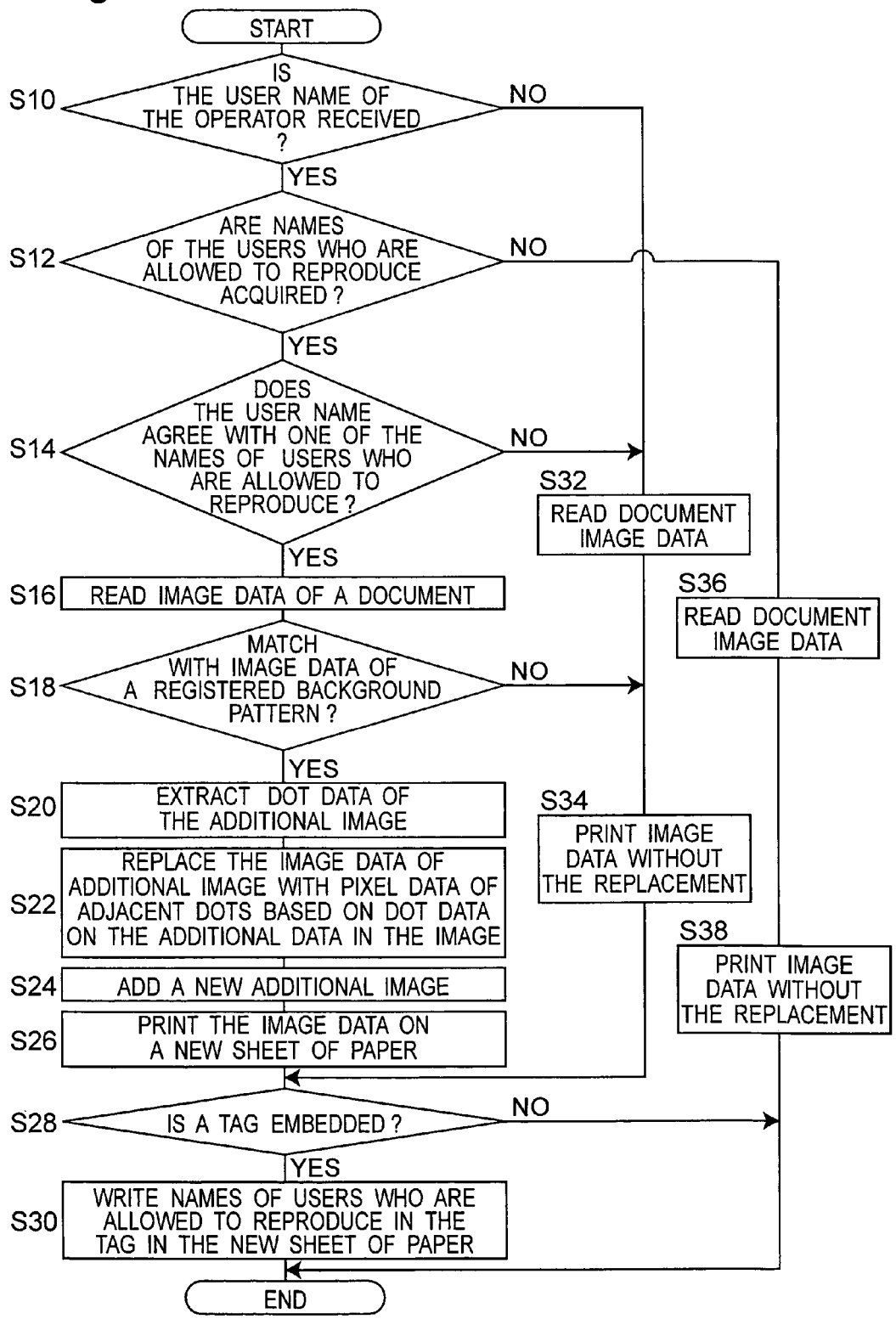

APPARATUS AND METHOD FOR CONTROLLING PRINTING OF INFORMATION EMBEDDED IN A DOCUMENT

This application is based on application Ser. No. 2005-122200 filed in Japan, the contents of which are hereby incorporated by reference.

BACKGROUND OF THE INVENTION

The invention relates to image processing for suppressing illegal reproduction of a secret document or the like.

Recently, electrophotographic copying machines are used widely, and anyone can copy a document including characters and/or images printed on a sheet of paper or the like easily. Especially, in color digital copying machines and multifunctional peripherals available recently, technologies on image processing and on image forming are improved very much, so that a reproduction very hard to be discriminated from an original can be produced easily. Therefore, it is an important problem to prevent illegal copying of a secret document or the like.

In order to prevent illegal copying and leakage of a print, on which a reproduction is inhibited, it is known to embed an additional image which cannot be recognized or is hard to be recognized with naked eye in the print. The additional image added to a document becomes visualized and can be observed clearly in a print thereof after it is printed with an image forming apparatus such as a printer (refer to, for example, Japanese Patent laid open Publications 2001-197297, 2004-201068 and 2004-228897). The additional image is intended to suppress illegal copying thereof psychologically. For example, if a sentence such as "COPY INHIBIT" is embedded as the additional image in an image of an original, when it is copied, a reproduction thereof is not similar to the original, or the sentence embedded in the image of the original is visualized in the reproduction. Therefore, when one sees the reproduction, it is clear that it is not the original because the sentence such as "COPY INHIBIT" which cannot be recognized or is hard to be recognized with naked eye is visualized in the original.

An example for adding information to be recognized with naked eye to a document is described in, for example, Japanese Patent laid open Publication 2004-153568. A document image is liable to become yellow, dirty or the like due to deterioration in various factors. On the other hand, a color original document image may become necessary when a large number of copies are produced with a monochromatic copying machine are printed and distributed. Then, in a copying machine described in Japanese Patent laid open Publication 2004-153568, information on the original document such as a barcode or uniform resource locator (URL) for representing a storage position of the original document is added to an image to be printed. Then when the printed image is put and scanned on a platen in the copying machine, the original image can be taken out automatically. Further, when a document is read and the information on the document is recognized, the portion for the information can be printed black in order to prevent unnecessary exposure of the information on the position of the original and to improve the security of the original. It is to be noted that this technology is not related to the prevention of illegal copying.

When an original with an additional image to suppress illegal copying as mentioned above is copied in an image forming apparatus, even when a creator of the original copies it, an image of the reproduction clearly shows that it is not an original. Thus he or she cannot get a print which is the same as a document wherein the additional image is not visualized or a document which is the same as an original without the additional image. However, it is desirable that a legitimate user such as a creator of the document can produce a copy which is the same as the document or the original. It is also to be noted that a situation wherein a copy which is the same as the document or the original is needed happens suddenly in usual cases. Then, a copying machine which is needed to be connected to a network, as described in Japanese Patent laid open Publication 2004-153568, cannot deal it.

SUMMARY OF THE INVENTION

An object of the invention is that when the document includes an additional image to be added to the original and to be visualized on image forming, an appropriate user can produce a reproduction which is the same as a document wherein the additional image is not visualized or a reproduction which is the same as an original including no additional image.

In one aspect of the invention for forming an image, a document including an original image and an original additional image is read to provide document image data, the original additional image being visualized when the document is reproduced. Original image data in correspondence to the original image is extracted from the document image data, and output image data is created based on the extracted original image data. Then, printing is performed based on the created output image data.

An advantage of the present invention is that when a document includes an original additional image to be added to the original and to be visualized on image forming, a reproduction which is the same as a document or as an original is produced.

BRIEF DESCRIPTION OF THE DRAWINGS

These and other objects and features of the present invention will become clear from the following description taken in conjunction with the preferred embodiments thereof with reference to the accompanying drawings, and in which:

FIG. 3 is a flowchart of the addition of an image.

DETAILED DESCRIPTION OF THE PREFERRED EMBODIMENTS

Figure 1:
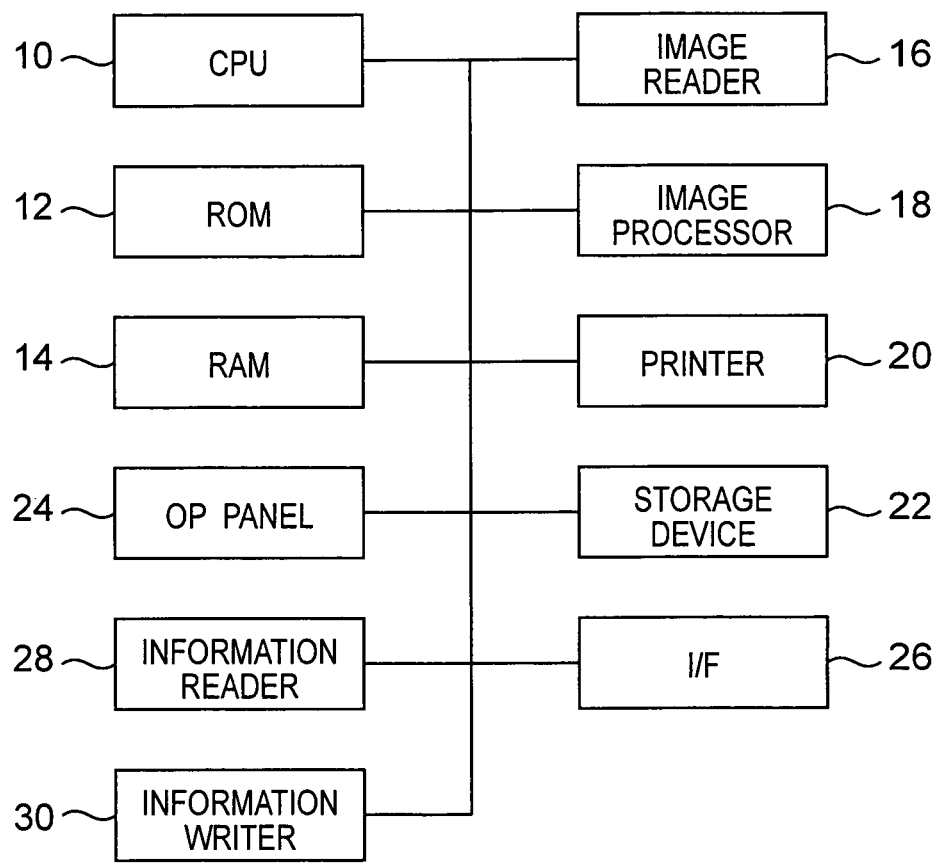
FIG. 1 is a block diagram of a multi-functional peripheral of an embodiment of the invention.

Referring now to the drawings, wherein like reference characters designate like or corresponding parts throughout the several views, FIG. 1 shows a structure of a multifunctional peripheral (MFP) as an example of an image forming apparatus of an embodiment according to the invention. The multifunctional peripheral is a network device which can function as a scanner, a printer, a copying machine or the like. It has a central processing unit (CPU) 10 which controls the entire device, and the CPU 10 is connected to a read-only memory (ROM) 12 storing programs and the like, a random access memory (RAM) 14 used as a work area, an image reader 16, an image processor 18, a printer 20, a storage device 22 or a hard disk drive in this example, an operation panel 24 used for instructions and for display, and an interface controller 26 for transmission (communication) of various signals to and from the external. When the multifunctional peripheral functions as a printer, an image is printed by the printer 20. When it functions as a copying machine, an image or RGB data read by the image reader 16 is subjected to various corrections by the image processor 18, and is converted to print data or CMYK data. The printer 20 prints the image on a sheet of paper based on the print data. The storage device 22 stores an image processing program (FIG. 3). It also stores data on an original additional image as will be explained later. The operation panel 24 receives an input of an instruction or a data by a user and shows various displays. Further, the multifunctional peripheral can perform a job registered from an external device.

In order to suppress forgery, falsification and illegal copy of a print of an important document or the like, it is proposed to embed an additional image which cannot be recognized or is hard to be recognized with naked eye. When a print wherein such an additional image is embedded in an original is subjected to a processing such as copying operation, the additional image is visualized. This visualization has an advantage to suppress illegal copying psychologically. The additional image consists of, for example, dots added to a part or parts of the original, the dots having a size different from the other part or parts. Further, many various techniques using linear images, dots, wavy lines, tone jump, Moire patterns are known, and an appropriate one may be used. The additional image includes characters or images, such as a sentence of "COPY INHIBIT", "REPRODUCTION", or a name of the creator, or the like, which shows clearly that the print is a reproduction of a document embedding the additional image. The additional image is created, for example, as a pattern repeated uniformly. It is explained below when a background pattern image is used as the additional image. The background image (i.e. additional image) is superposed on the original image, and the original image and the background image are formed in a document.

When a document including an additional image is copied with the above-mentioned multifunctional peripheral, the additional image is visualized in the reproduction. In an example, resolution limit is used on image reading with a charged-coupled device (CCD) sensor or the like in the image reader 16. When the size of the dots or the like is smaller than the recognizable resolution, the dots or the like are vanished after the reading. If the resolution of reading is about 10 lines/mm, the reproducibility is deteriorated remarkably on scanning, when the printing is performed with a resolution larger than that of reading. If the additional image is made of a pattern having a resolution smaller than the resolution for reading, it is visualized in a reproduction thereof. That is, it can be visualized and be observed clearly by using a difference between the resolutions for printing and for reading.

Figure 2:
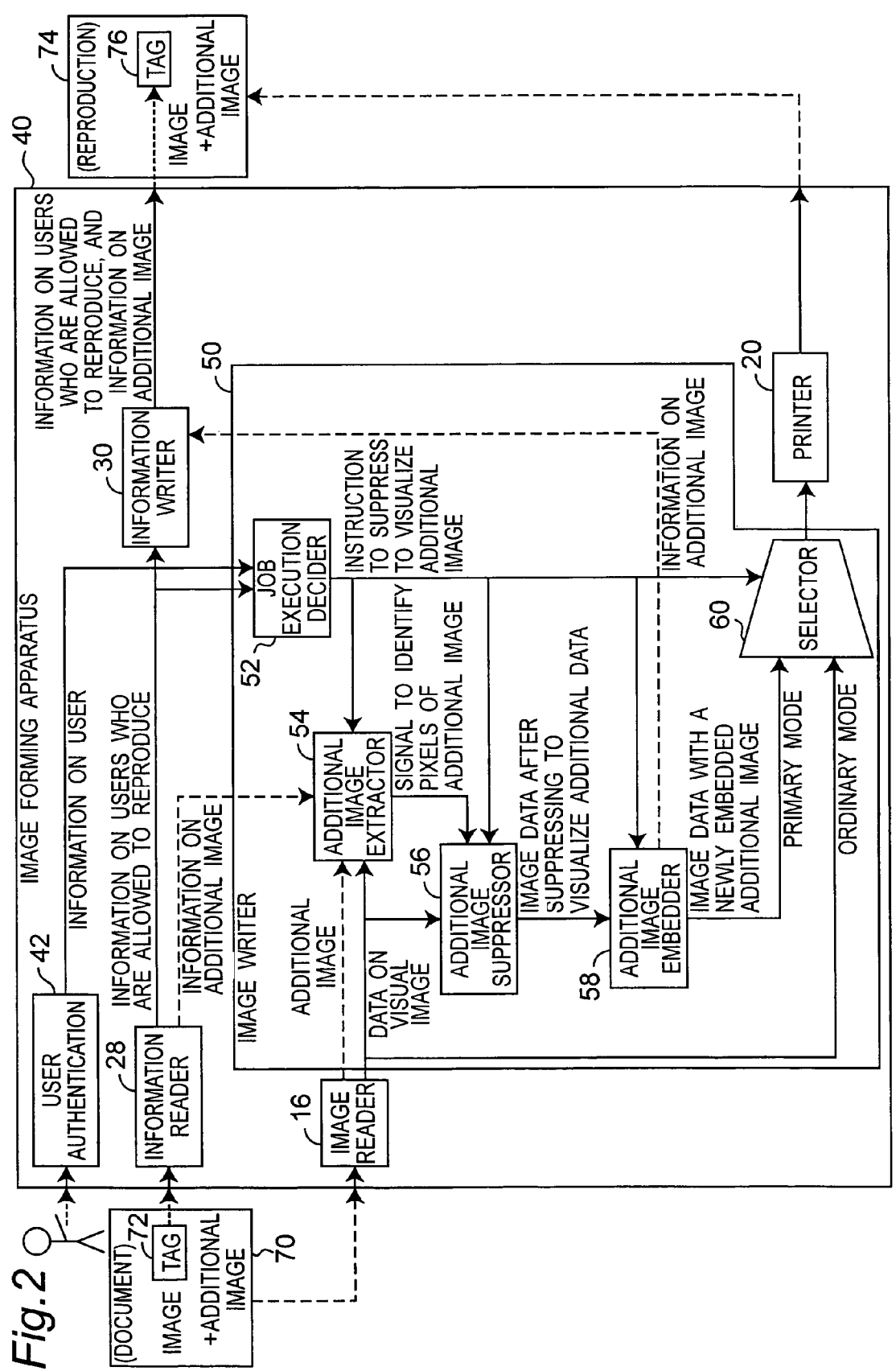
FIG. 2 is a diagram of functional blocks for processing an additional image.

FIG. 2 is a diagram of functional blocks for processing an additional image in the multi-functional peripheral, which has the image reader 16, an information reader 28, an information writer 30, a user authenticator 42 and an image writer 50. The image writer 50 is a part of the image processor 18.

As mentioned above, an additional image is embedded in a document 70 beside an image of an original, and it is created so that it is visualized and is observed clearly when the document including the original image and the additional image is copied. Further, the document 70 is prepared by using a sheet of paper wherein a radio frequency identification tag 72 or a non-contact integrated circuit (IC) tag as a storage medium is embedded. The radio frequency identification tag stores information on a user or users who are allowed to reproduce the document 70. The user who is allowed to reproduce the document 70 is for example a creator of the document. Further, it also stores information on the embedded additional image such as positions of pixels of which the additional image is composed and patterns of the additional image. The image of the document is reproduced on a sheet of paper wherein a radio frequency identification tag 76 is embedded to provide a reproduction 74.

The above-mentioned multifunctional peripheral 40 can perform printing or copying on a conventional sheet of paper, while it can also perform printing or copying on a sheet of paper wherein a radio frequency identification tag is embedded, as mentioned above. Then, the multifunctional peripheral 40 has the information reader 28 and the information writer 30 for communication with the radio frequency identification tags 72, 76. The information reader 28 reads information from the radio frequency identification tag 72, while the in formation writer 30 writes information to the radio frequency identification tag 76. The information reader 28 can read information from the radio frequency identification tag 72 embedded in a sheet of paper on printing. Further, the information writer 30 writes information on users to whom the reproduction of the document is allowed in the radio frequency identification tag 76 on printing.

When a user logs in, the multifunctional peripheral can decide whether the user is included in the user information in the radio frequency identification tag 72 based on the information read from the tag 72 by the information reader 28. If the log-in user is included in the user information, or if the user is allowed to reproduce the document, the additional image data is extracted from the image data read from the document, and the additional image data is deleted. Then, additional data which becomes the additional image is added to the image data including only the original image obtained by deleting the additional image, and the reproduction 74 is produced. By adding the additional data which is the same as the additional image again, the reproduction 74 has a visual image similar to the original 70. Then the information writer 30 writes names of users who are allowed to reproduce the document such as a creator or the document to the radio frequency identification tag 76 in the reproduction 74. On the other hand, if the log-in user is not included in the user information read from the radio frequency identification tag 72, when a reproduction 74 of the document 70 is produced, it includes the additional image to be observed clearly. An image processing program on the additional image is executed by the CPU 10. The image data read by the image reader 16 is stored in the image memory in the image processor 18. As mentioned above, the image processing program detects an additional image data from the image data, deletes the additional image data and adds an additional data again as image data to be added newly to the image data of the original. By printing the image data to which the additional data is added, the reproduction is obtained which is the same as the document wherein the additional image is not visualized.

The user authenticator 42 is, for example, a user authentication program stored in the ROM 12 for identifying the name of a log-in user. When a user enters a user name and a password to start a copying operation, they are compared with the counterparts registered already. When they agree with each other, the user is allowed to operate the multifunctional peripheral 40. Thus, the name of a user who starts the copying operation can be identified On the other hand, when the radio frequency identification tag 72 embedded in the document 70 stores user information on users who are allowed to produce a reproduction of the document, the information reader 28 reads the user information stored in the radio frequency identification tag 72 via wireless communication, and the users who are allowed to produce a reproduction of the document are identified. Further, when information on the additional image embedded in the document 70 is recorded in the tag 72, the information can also be read. On the other hand, the information writer 30 can write the information on the documents such as the user names obtained by the information reader 28, and, if necessary, the information on the newly added additional image to the tag 76 in the reproduction 74, such as additional data, through wireless communication.

The image reader 16 can read the original image and the additional image printed on the document optically.

Next, the processing on the additional image read from the document is explained. The image writer 50 has ordinary mode and primary mode. In the ordinary mode, an image is printed on a sheet of paper based on the image data read by the image reader 16. When the image data read includes additional image data, an image is formed so that the additional image is observed clearly. On the other hand, in the primary mode, when additional image data is detected in the image data read by the image reader 16, the detected additional image data is deleted, and additional data is added newly again to the image wherein the additional image data has been deleted. Then, the image data is printed. Thus, a reproduction is obtained which is the same as the document wherein the additional image is not visualized. The primary mode is performed when the user information obtained by the user authenticator 42 agrees with the user information read by the information reader 28, that is, when a user who is allowed to reproduce the document performs printing. If they do not agree with each other, the document is printed in the ordinary mode, and the additional image is visualized in the reproduction. The detection and deletion of the additional image data, and re-addition of the additional data in the primary mode are explained below in detail.

The detection and deletion of additional image data can be realized in three approaches explained below. In a first approach, information "A" on the additional image added by the multifunctional peripheral 40 is registered beforehand in the image writer 50. Then, matching on the visual data read by the image reader 16 is performed based on the registered additional information "A", to detect the additional image data. Further, the additional image data is deleted for the pixels included in the detected additional image data. Then, pixel data or values of pixels before the additional image is visualized are predicted, and the pixel data are replaced with the predicted values to create the output image data. The prediction is performed for example by interpolation on data of pixels adjacent to the pixel of interest. This technique is effective only for a document wherein the additional image is embedded by this multifunctional peripheral 40. That is, the information "A" registered beforehand in the image writer 50 relates to additional image which can be added by the multifunctional peripheral 40.

In concrete, in the image writer 50, the job execution decider 52 compares the information on the user acquired by the user authenticator 42 who is allowed to perform a copying job with the information on users who are allowed to produce a reproduction of the document acquired by the information reader 28. If they agree with each other, an instruction to suppress the visualization of additional image is outputted in order to select the primary mode for processing the additional image.

Next, the additional image extractor 54 receives the instruction to suppress the visualization of additional image from the job execution decider 52, and performs matching of the visual image read by the image reader 16 with the detection pattern of the additional image stored in the additional image extractor 54 to identify pixels wherein the additional image is embedded. Then, the position information on the identified pixels is sent to the additional image suppressor 56.

Next, the additional image suppressor 56 predicts values of the identified pixels before the additional image is embedded, from the values of pixels adjacent to the pixel of interest, based on the position information on the identified pixels, and it replaces the image data of the pixels with the predicted values. When this prediction is performed, an interpolation to average the values of the adjacent pixels may be adopted. Alternatively, if a value to be replaced is determined based on the original pixel value, the value to be replaced can be determined based on the current value.

Next, an additional data embedder 58 embeds additional data newly in the image data replaced with the predicted values. Then, information on the additional data is sent to the information writer 30.

Next, a selector 60 sends image data processed by the additional image extractor 54, the additional image suppressor 56 and the additional image embedder 58 when the instruction from the job execution decider 40 is active. Otherwise the image data as read by the image reader 16 is outputted. The output image data is converted to print data and is sent to the printer 20.

In the second approach, the information reader 28 reads information "B" on the additional image included in the document 70 and held in the storage medium (tag 72) in the document 70 through wireless communication, and the additional image extractor 54 performs matching of the read image data based on the information "B", to extract the additional image data. Next, the additional image suppressor 56 replaces the pixel data of the extracted additional image with values of the image without the additional image data. In this case, if the information "B" includes information when the additional image is embedded, for example, information on the additional image, the pixel positions, pixel information before embedding, the detection of the additional image data and replacement of the data on the image without including the additional image data.

In the third approach, an original including only the additional image is read beforehand in the image reader 16, and the data of the original is stored as information "C" on the additional image (image pattern) used for extracting the additional image. Then, when the additional image is extracted from the image data read by the image reader 16, the image read by the image reader 16 is matched with the additional image data, to detect the additional image data in the image. In this case, as to the pixels on which the additional image data are detected by the additional image extractor 54, the additional image suppressor 56 predicts values of the image without the additional image data from pixels adjacent to the pixel on which the additional image data is detected. Thus, a reproduction without visualized additional image is provided, and as to a document printed by an image forming apparatus other than the multifunctional peripheral 40, it is possible to suppress for the additional image to be visualized.

A various pattern may be used as the additional image, and the matching may be performed appropriated for each of the patterns. Further, in the detection of the additional image, the matching may be performed only in a part in the image wherein the additional image is present, in order to detect the additional image, and the predicted values may be determined based on adjacent pixels only for the pixels in the pattern. Similarly, when the positions of the additional image are known, the predicted values may be determined on the values of pixels adjacent to the pixel in correspondence to the additional image.

FIG. 3 is a flowchart of the image addition according to the first approach executed by the CPU 10. At a start of a copy sequence, a log-in input of a user name and a password of an operator is received for user authentication (S10). If the user authentication is established, the user name of the operator is acquired. Next, the user names of users who are allowed to reproduce the document such as a creator of the document is acquired through wireless communication from a radio frequency identification tag with the information reader 28 (S12). Further, the information on additional image may also be acquired from the tag. Next, the user name of the operator is compared with the user names who are allowed to reproduce the document (S14). This corresponds to the job execution decider 52 in FIG. 2. If they agree with each other, the image data of the document 70 is read by the image reader 16 (S16). The image data read by the image reader 16 is stored in the image memory in the image processor 18.

Next, the additional image is processed. In this embodiment, the processing on additional image at steps S18 to S30 in FIG. 3 corresponds to the image writer 50 in FIG. 2. This processing is performed on the image data stored in the image memory in the image processor 18.

First, the image data is compared with the additional image information (or data of image pattern of the additional image) registered beforehand in the information writer 30 (S18). This corresponds to the additional image extractor 52 in FIG. 2. If there is an image having a high degree of matching, it is decided to be the additional image, and dot data or pixel data in the additional image are extracted (S20). This corresponds to the additional image extractor 54 in FIG. 2. Next, as to the pixel data of the additional image, pixel values without the additional image are predicted based on the pixel data of pixels adjacent to the pixel included in the additional image (S22). This corresponds to the additional image suppressor 56 in FIG. 2. Then, new additional data is added to the image data (S24). This corresponds to the additional image embedder 58 in FIG. 2. Next, the image data is outputted (S26). Thus, an image is printed by the printer 20 on a new sheet of paper.

The above-mentioned processing on the additional image is different in other approaches than the first approach. In the second approach, at step S12, other information on the additional information is also read from the radio frequency identification tag. The additional information may include detailed information on the additional image, for example, pixel values of additional image, pixel positions and pixel values before embedding. In this case, at step S18, the matching at step S18 is performed by using the image pattern of the additional image read from the tag. Then, at step S22, based on the detailed information, the pixel data on which the additional image is detected are replaced with the values of adjacent pixels. On the other hand, in the third approach, the image reader 16 reads an original of only the additional image beforehand, and the additional image data are stored in the storage device 22. In this case, it is not needed at step S12 to acquire information on additional image from the radio frequency identification tag. Then, similarly to the first approach, at steps S18 and S20, the matching is performed with the image pattern of the additional image, and the pixel values are predicted based on the information on pixel positions of the additional image determined by the matching by using the values of pixels adjacent to the pixel positions, and the pixel data are replaced with the predicted values.

Returning to FIG. 3, it is decided next whether a radio frequency identification tag is embedded in a sheet of paper for forming an image in the printer 20 or not (S28). If the tag is embedded, the user names of users who are allowed to reproduce the document, such as a creator of the original, are written by the information writer 30 (S30), otherwise the processing is completed.

On the other hand, when the authentication is not established at step S10 and the user name of the operator cannot be obtained, or when the user name do not agree with the names of users who are allowed to reproduce the document at step S14, image data of the document is read by the image reader 16 (S32). Then, the image data without the above-mentioned replacement is converted to the print data and sent to the printer 20 (S34). Further, if there is no image having a high degree of matching at step S18, the flow proceeds to step S34. Thus, image data without the replacement is printed on a new sheet of paper.

Further, when the names of the users who are allowed to reproduce the document are not acquired at step S12, the image data of the document is read with the image reader 16 (S36). Then, the image data are converted to print data and are sent to the printer 20 (S38). Thus the processing of this flow is completed.

In the above-mentioned embodiment, in order to suppress visualization of additional data when the image is formed, the additional image data is deleted in the image data when the additional image data is detected, and new additional data is added. Thus, a reproduction is obtained which is the same as the document wherein the additional image is not visualized. However, in order to prevent visualization of the additional image, it is not necessary to add a new additional data. That is, it is sufficient to detect and delete the additional image data and to reproduce the document based on the obtained image data of only the original. Then, a reproduction which is the same as the original wherein no additional image is added can be obtained. Further, it is also known to change the additional image to white when an additional image is embedded in a background image. In this case, too, the above-mentioned processing to detect and delete the additional image data and to add the additional data again can be applied similarly.

Further, in the above-mentioned embodiment, a radio frequency identification tag embedded in a sheet of paper is used as an information storage medium in order to read information on the additional image from the document. However, the storage medium is not limited to the radio frequency identification tag. For example, information on the additional image may be added as a barcode or the like formed on a sheet of paper. When the document is read, the barcode or the like may be detected from the image data read by the image reader, so that information on the additional data and on users who are allowed to reproduce the document can be obtained. By using the matching on the document image data, the additional image data can be identified and deleted. Further, the user authentication can be performed based on the user information read as mentioned above.

As explained above, when a document includes an additional image to be added to the original and to be visualized on image forming, a reproduction which is the same as a document or as an original is produced. Preferably, because a reproduction which is the same as the document wherein the additional image is not visualized can be produced, a document having an advantage to suppress copying can be provided.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus comprising:
   an image reader configured to read an original document including an original image and an original additional image to provide document image data;
   an image processor configured to extract original image data in correspondence to the original image from the document image data read by said image reader and create output image data based on the extracted original image data; and
   a printer configured to perform printing based on the output image data created by said image processor to produce an output document;
   wherein the original additional image is printed with greater visibility in the output document than in the original document when the printing is performed under unauthorized conditions due to vanishing of a part of the original additional image during reading by the image reader resulting from the part of the original additional image comprising dots smaller than a recognizable resolution of the image reader; and
   wherein said image processor adds first data to the extracted original image data to create the output image data when the printing is performed under authorized conditions, the first data forming a first additional image that is the same as the original additional image when the output image data is printed.

2. The image forming apparatus according to claim 1, wherein said image processor extracts the original image data by deleting second data in correspondence to the original additional image from the document image data, based on information on the original additional image.

3. The image forming apparatus according to claim 2, wherein said image processor creates the output image data by performing interpolation based on pixel data adjacent to positions where the second data is deleted in the document image data.

4. The image forming apparatus according to claim 2, further comprising a storage medium for storing information on the original additional image, wherein said image processor performs matching of the document image data based on the information on the original additional image stored in said storage medium to identify the second data and deletes the identified second data.

5. The image forming apparatus according to claim 2, further comprising an information reader which reads information on the original additional image from a document, wherein said image processor performs matching of the document image data based on the information on the original additional image to identify the second data and deletes the identified second data.

6. The image forming apparatus according to claim 1, further comprising:
   a user authenticator which performs user authentication of a user; and
   a controller which inhibits an operation of said image processor when the user is not authenticated, and controls printing based on the document image data.

7. The image forming apparatus according to claim 6, further comprising an information reader which reads information on users from the original document, wherein said user authenticator performs the user authentication based on the user information read by said information reader.

8. The image forming apparatus according to claim 7, wherein said information reader reads the information from a recording medium embedded in the original document.

9. An image forming method comprising:
   reading an original document including an original image and an original additional image to provide document image data;
   extracting original image data in correspondence to the original image from the document image data, and creating output image data based on the extracted original image data; and
   performing printing based on the created output image data to produce an output document;
   wherein the original additional image is printed with greater visibility in the output document than in the original document when the printing is performed under unauthorized conditions due to vanishing of a part of the original additional image during reading resulting from the part of the original additional image comprising dots smaller than a recognizable resolution used for reading; and
   wherein first data is added to the extracted original image data to create the output image data when the printing is performed under authorized conditions, the first data forming a first additional image that is the same as the original additional image when the output image data is printed.

10. The image forming method according to claim 9, wherein the original image data is extracted by deleting second data in correspondence to the original additional image from the document image data based on information on the original additional image.

11. The image forming method according to claim 10, wherein in the creation of the output image data, interpolation is performed based on pixel data adjacent to positions where the second data is deleted in the document image data.

12. The image forming method according to claim 9, further comprising:
   performing user authentication of a user; and
   inhibiting the creation of the output image data based on the extracted original image data when the user is not authenticated, and performs printing based on the document image data.

13. The image forming method according to claim 12, further comprising reading information on users from the original document, wherein the user authentication is performed based on the information on users.

14. The image forming method according to claim 13, wherein the information on users is read from a recording medium embedded in the original document.

15. A computer-executable program stored in a non-transitory computer-readable medium and configured to control an apparatus to perform a method for forming an image, the method comprising the steps of:
   reading an original document including an original image and an original additional image to provide document image data, the original additional image being visualized when the document is reproduced;
   extracting original image data in correspondence to the original image from the document image data, and creating output image data based on the extracted original image data; and
   performing printing based on the created output image data to produce an output document;
   wherein the original additional image is printed with greater visibility in the output document than in the original document when the printing is performed under unauthorized conditions due to vanishing of a part of the original additional image during reading resulting from the part of the original additional image comprising dots smaller than a recognizable resolution used for reading; and wherein first data is added to the extracted original image data to create the output image data when the printing is performed under authorized conditions, the first data forming a first additional image that is the same as the original additional image when the output image data is printed.

16. The computer-executable program for forming an image according to claim 15, wherein in the step of creating the output image data, the original image data is extracted by deleting second data in correspondence to the original additional image from the document image data based on information on the original additional image.

17. The computer-executable program for forming an image according to claim 15, wherein in the step of creating the output image data, interpolation is performed based on pixel data adjacent to positions where the second data is deleted in the document image data.

18. The computer-executable program for forming an image according to claim 15, further comprising the step of performing user authentication of a user, wherein the step of creating the output image data is skipped when the user is not authenticated, and in the step of printing, the printing is performed based on the document image data.

19. The computer-executable program for forming an image according to claim 18 further comprising the step of reading information on users from the original document, wherein in the step of performing user authentication, the user authentication is performed based on the information on users.

20. The computer-executable program for forming an image according to claim 19 wherein in the step of reading user information from the original document, the information is read from a recording medium embedded in the original document.

\* \* \* \* \*